United States Patent
Miki et al.

(10) Patent No.: US 10,950,363 B2
(45) Date of Patent: Mar. 16, 2021

(54) ACTIVE MATERIAL FOR NEGATIVE ELECTRODES OF NONAQUEOUS SECONDARY BATTERIES, AND NONAQUEOUS SECONDARY BATTERY

(71) Applicant: DIC CORPORATION, Tokyo (JP)

(72) Inventors: Takayuki Miki, Sakura (JP); Yasuhiro Takada, Sakura (JP); Shinichi Nonaka, Tokyo (JP); Masami Ookuma, Tokyo (JP); Kiyoo Kamei, Sakura (JP); Toshinori Nishiyama, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/794,316

(22) Filed: Oct. 26, 2017

(65) Prior Publication Data

US 2018/0053937 A1 Feb. 22, 2018

Related U.S. Application Data

(62) Division of application No. 14/653,016, filed as application No. PCT/JP2013/083728 on Dec. 17, 2013, now abandoned.

(30) Foreign Application Priority Data

Dec. 19, 2012 (JP) ................................. 2012-276822
Dec. 19, 2012 (JP) ................................. 2012-276823

(51) Int. Cl.
| | |
|---|---|
| *H01B 1/04* | (2006.01) |
| *H01M 4/36* | (2006.01) |
| *H01M 4/38* | (2006.01) |
| *H01M 4/587* | (2010.01) |
| *H01M 4/60* | (2006.01) |
| *H01M 4/62* | (2006.01) |

(52) U.S. Cl.
CPC .............. *H01B 1/04* (2013.01); *H01M 4/364* (2013.01); *H01M 4/386* (2013.01); *H01M 4/587* (2013.01); *H01M 4/602* (2013.01); *H01M 4/604* (2013.01); *H01M 4/625* (2013.01)

(58) Field of Classification Search
CPC .. H01B 1/04; H01B 1/08; H01B 1/24; H01M 4/133; H01M 4/134; H01M 4/1393; H01M 4/1395; H01M 4/36; H01M 4/362; H01M 4/364; H01M 4/366; H01M 4/386; H01M 4/485; H01M 4/583; H01M 4/587; H01M 4/602; H01M 4/604; H01M 4/625
See application file for complete search history.

(56) References Cited

U.S. PATENT DOCUMENTS

| 5,587,256 A | 12/1996 | Wilson et al. | |
|---|---|---|---|
| 5,698,340 A * | 12/1997 | Xue | H01M 4/36 |
| | | | 423/594.15 |
| 5,824,280 A * | 10/1998 | Dahn | H01M 4/587 |
| | | | 423/325 |
| 7,358,011 B2 | 4/2008 | Fukuoka et al. | |
| 7,658,863 B2 | 2/2010 | Aramata et al. | |
| 7,790,316 B2 * | 9/2010 | Aramata | H01B 1/122 |
| | | | 252/182.1 |
| 2003/0104131 A1 | 6/2003 | Konno et al. | |
| 2006/0022198 A1 | 2/2006 | Aramata et al. | |
| 2012/0121981 A1 * | 5/2012 | Harimoto | H01G 11/30 |
| | | | 429/213 |
| 2012/0121982 A1 * | 5/2012 | Harimoto | H01G 11/02 |
| | | | 429/213 |
| 2014/0346410 A1 * | 11/2014 | Lu | H01M 4/136 |
| | | | 252/506 |

FOREIGN PATENT DOCUMENTS

| JP | 8-40716 A | 2/1996 |
|---|---|---|
| JP | 8-259213 A | 10/1996 |
| JP | 10-275617 A | 10/1998 |
| JP | 2003-197193 A | 7/2003 |
| JP | 2006-62949 A | 3/2006 |
| JP | 2012-178224 A | 9/2012 |
| WO | 2008/081883 A1 | 7/2008 |
| WO | 2012/150671 A1 | 8/2012 |

OTHER PUBLICATIONS

International Search Report dated Mar. 11, 2014, issued in corresponding application No. PCT/JP2013/083728.
Qiu et al., "Ultrafine tin nanocrystallites encapsulated in mesoporous carbon nanowires: scalable synthesis and excellent electrochemical properties for rechargeable lithium ion batteries", Chem. Commun., 2010, pp. 8359-8361, vol. 46, cited in the Specification.
Ji et al., "Multilayer nanoassembly of Sn-nanopillar arrays sandwiched between grapheme layers for high-capacity lithium storage", Energy & Environmental Science, 2011, pp. 3611-3616, vol. 4, cited in the Specification.

* cited by examiner

*Primary Examiner* — Matthew R Diaz
(74) *Attorney, Agent, or Firm* — Westerman, Hattori, Daniels & Adrian, LLP

(57) ABSTRACT

An active material having a high capacity for negative electrodes of nonaqueous secondary batteries is provided by pyrolysis of a composite resin (A) which has a silanol group and/or a hydrolysable silyl group and which contains a polysiloxane segment (a1) and a polymer segment (a2) other than the polysiloxane segment (a1), and furthermore, a negative electrode using the above active material and a nonaqueous secondary battery including the above negative electrode are also provided. In addition, by pyrolysis of a dispersion liquid obtained from the composite resin (A), silicon particles, and an organic solvent, an active material having a high capacity for negative electrodes of nonaqueous secondary batteries is provided, and furthermore, a negative electrode using the above active material and a nonaqueous secondary battery including the above negative electrode are also provided.

7 Claims, No Drawings

ACTIVE MATERIAL FOR NEGATIVE ELECTRODES OF NONAQUEOUS SECONDARY BATTERIES, AND NONAQUEOUS SECONDARY BATTERY

CROSS-REFERENCE TO RELATED APPLICATIONS

This application is a divisional of U.S. application Ser. No. 14/653,016, filed on Jun. 17, 2015, which is a 371 of International Application No. PCT/JP2013/083728, filed on Dec. 17, 2013, which is based upon and claims the benefit of priority from the prior Japanese Patent Application No. 2012-276823, filed on Dec. 19, 2012, and Japanese Patent Application No. 2012-276822, filed on Dec. 19, 2012, the entire contents of which are incorporated herein by reference.

TECHNICAL FIELD

The present invention relates to an active material for negative electrodes of nonaqueous secondary batteries which is obtained by pyrolysis of a specific resin and to a nonaqueous secondary battery.

BACKGROUND ART

As the present global movement, in consideration of the backgrounds of the Great East Japan Earthquake, social environmental issues, and the like, the way of energy utilization is now to be significantly changed. Concrete movements, such as the promotion of smart grid, and the start of a full amount purchase system of electricity, have occurred, and secondary batteries have been regarded as the most important key device in those movements.

Among various secondary batteries, although a lithium ion battery which can ensure a capacity even by its small size has most drawn attention, problems, such as a short travel distance of automobiles and a short use time of smart phones, may arise, and hence further development of increase in energy density has been pursued.

Among important materials to be developed for the purpose described above, an active material for negative electrodes may be mentioned. Although carbon-based materials, such as natural black lead, synthetic black lead, and graphite, have been currently used as an active material for negative electrodes, in order to increase the energy density as a battery, the carbon-based material has a certain limitation, and hence, a metal alloy-based active material, such as a Si-based or a Sn-based alloy, having a high theoretical capacity has been expected as a negative electrode material for next-generation batteries. However, the volume expansion of the material as described above is large during charge and discharge, and when the material is used as an electrode, for example, peeling of the electrode, collapse thereof, and breakage of an electrically conductive path may occur in some cases. As a result, for example, a life that can satisfy a practical use may not be disadvantageously obtained.

Accordingly, in order to improve the electrically conductive performance and to stabilize the active material itself, a method for compounding a Si metal with SiO, $SiO_2$, and/or carbon has been studied, and a novel active material exhibiting a high performance has been pursued.

For example, metal alloy particles of Si, Sn, Al, Co, and/or the like are compounded with carbon and are used as an electrode material for lithium ion secondary batteries, and several methods for forming the composite materials as described above have been proposed. For example, a method for forming a composite material by mechanically mixing a carbon material and metal alloy particles (for example, see PTL 1), a method for depositing metal nano particles from a liquid phase to a carbon phase by reduction (a plating method or an electroless method) (for example, see NPL 1), and a method for forming a laminate from a nano sheet metal and graphenes (for example, see NPL 2) may be mentioned.

However, in a mechanically mixing method and a reduction deposition method (plating method), since metal particles are liable to physically adhere to a surface of a carbon mother material, an interface adhesion force is relatively low, and the particles are disadvantageously liable to be peeled away from the surface of the mother material. Free particles thus peeled away may be fused together or grown during charge and discharge, so that the battery performance may be degraded in some cases. In addition, as a post treatment performed after pyrolysis, a treatment in consideration of coating characteristics in negative electrode formation and coating film properties is required. In a method for forming a nano sheet laminate, the operation is complicated, and the efficiency is also low; hence, this method may not be advantageously applied to an industrial mass production and the like.

CITATION LIST

Patent Literature

PTL 1: International Publication No. WO2008/081883

Non Patent Literature

NPL 1: Yongcai Qiu et al., Chem. Commun., 2010, 46, 8359 to 8361

NPL 2: Liwen Ji et al., Energy Environ. Sci., 2011, 4, 3611 to 3616

SUMMARY OF INVENTION

Technical Problem

In consideration of the backgrounds described above, the present invention aims to provide an active material for negative electrodes of nonaqueous secondary batteries which has a high capacity and excellent cycle characteristics and furthermore to provide a negative electrode using the above active material and a nonaqueous secondary battery including the above negative electrode.

Solution to Problem

Through intensive research carried out by the present inventors, it was found that an active material obtained by pyrolysis of a composite resin (A) which has a silanol group and/or a hydrolysable silyl group and which contains a polysiloxane segment (a1) and a polymer segment (a2) other than the polysiloxane segment (a1) has an excellent performance as an active material for negative electrodes of nonaqueous secondary batteries, and as a result, the present invention was completed.

That is, the present invention provides an active material for negative electrodes of nonaqueous secondary batteries obtained by pyrolysis of a composite resin (A) which has a silanol group and/or a hydrolysable silyl group and which contains a polysiloxane segment (a1) and a polymer segment (a2) other than the polysiloxane segment (a1).

In addition, the present invention provides a negative electrode for nonaqueous secondary batteries which uses the above active material for negative electrodes of nonaqueous secondary batteries.

Furthermore, the present invention provides a nonaqueous secondary battery including the above negative electrode for nonaqueous secondary batteries.

Advantageous Effects of Invention

Since the active material for negative electrodes of nonaqueous secondary batteries of the present invention has an excellent performance as a material for negative electrodes of nonaqueous secondary batteries, a negative electrode for nonaqueous secondary batteries and a nonaqueous secondary battery can be provided. In addition, the active material for negative electrodes of nonaqueous secondary batteries of the present invention can be manufactured by a simple method.

DESCRIPTION OF EMBODIMENTS

Hereinafter, although preferable modes of the present invention will be described by way of example, it is not to be understood that the present invention is limited thereto.

Item 1. An active material for negative electrodes of nonaqueous secondary batteries obtained by pyrolysis of a composite resin (A) which has a silanol group and/or a hydrolysable silyl group and which contains a polysiloxane segment (a1) and a polymer segment (a2) other than the polysiloxane segment (a1).

Item 2. In the active material for negative electrodes of nonaqueous secondary batteries described in Item 1, the polysiloxane segment (a1) is a polysiloxane segment having a structural unit represented by the following general formula (S-2) and/or the following general formula (S-3).

[Chem. 1]

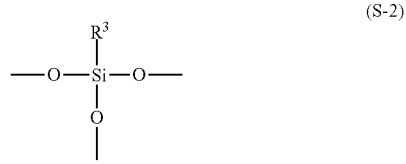
(S-2)

[Chem. 2]

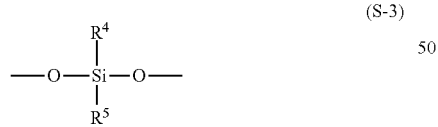
(S-3)

(In the above general formulas (S-2) and (S-3), $R^3$, $R^4$, and $R^5$ each independently represent an alkyl group having 1 to 6 carbon atoms, a cycloalkyl group having 3 to 8 carbon atoms, an aryl group, or an aralkyl group having 7 to 12 carbon atoms.)

Item 3. In the active material for negative electrodes of nonaqueous secondary batteries described in Item 1 or 2, the content of the polysiloxane segment (a1) is 10 to 95 percent by mass with respect to the composite resin (A).

Item 4. In the active material for negative electrodes of nonaqueous secondary batteries described in any one of Items 1 to 3, the polymer segment (a2) is a vinyl polymer segment.

Item 5. In the active material for negative electrodes of nonaqueous secondary batteries described in any one of Items 1 to 4, the composite resin (A) is a composite resin in which the polysiloxane segment (a1) and the polymer segment (a2) are bonded to each other by a structure represented by the following structural formula (S-5).

[Chem. 3]

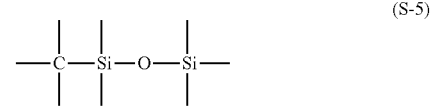
(S-5)

(In the formula, the carbon atom is a carbon atom forming the polymer segment (a2), and the two silicon atoms are silicon atoms forming the polysiloxane segment (a1).)

Item 6. An active material for negative electrodes of nonaqueous secondary batteries which is obtained by pyrolysis of a dispersion liquid obtained from silicon particles, an organic solvent, and a composite resin (A) which has a silanol group and/or a hydrolysable silyl group and which contains a polysiloxane segment (a1) and a polymer segment (a2) other than the polysiloxane segment (a1).

Item 7. In the active material for negative electrodes of nonaqueous secondary batteries described in Item 6, the pyrolysis is performed so that after the dispersion liquid is sprayed and dried, a dried product obtained thereby is pyrolyzed.

Item 8. In the active material for negative electrodes of nonaqueous secondary batteries described in Item 6, the pyrolysis is performed under spray pyrolysis condition for the dispersion liquid.

Item 9. In the active material for negative electrodes of nonaqueous secondary batteries described in any one of Items 6 to 8, the polysiloxane segment (a1) is a polysiloxane segment having a structural unit represented by the following general formula (S-2) and/or the following general formula (S-3).

[Chem. 3]

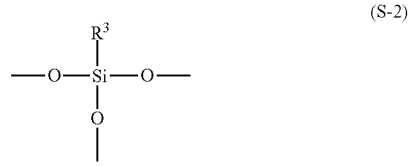
(S-2)

[Chem. 4]

(S-3)

(In the above general formulas (S-2) and (S-3), $R^3$, $R^4$, and $R^5$ each independently represent an alkyl group having 1 to 6 carbon atoms, a cycloalkyl group having 3 to 8 carbon atoms, an aryl group, or an aralkyl group having 7 to 12 carbon atoms.)

Item 10. In the active material for negative electrodes of nonaqueous secondary batteries described in any one of Items 6 to 9, the content of the polysiloxane segment (a1) is 10 to 95 percent by mass with respect to the composite resin (A).

Item 11. In the active material for negative electrodes of nonaqueous secondary batteries described in any one of Items 6 to 10, the polymer segment (a2) is a vinyl polymer segment.

Item 12. In the active material for negative electrodes of nonaqueous secondary batteries described in any one of Items 6 to 11, the composite resin (A) is a composite resin in which the polysiloxane segment (a1) and the polymer segment (a2) are bonded to each other by a structure represented by the following structural formula (S-5).

[Chem. 3]

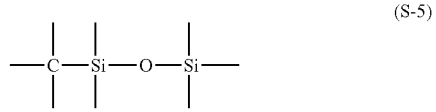

(S-5)

(In the formula, the carbon atom is a carbon atom forming the polymer segment (a2), and the two silicon atoms are silicon atoms forming the polysiloxane segment (a1).)

Item 13. In the active material for negative electrodes of nonaqueous secondary batteries described in any one of Items 1 to 12, the active material is non-porous.

Item 14. A negative electrode for nonaqueous secondary batteries which uses the active material for negative electrodes of nonaqueous secondary batteries described in any one of Items 1 to 13.

Item 15. A nonaqueous secondary battery which uses the negative electrode for nonaqueous secondary batteries described in Item 14.

Item 16. A method for manufacturing an active material for negative electrodes of nonaqueous secondary batteries, the method comprising: performing spray drying of a dispersion liquid obtained from silicon particles, an organic solvent, and a composite resin (A) which has a silanol group and/or a hydrolysable silyl group and which contains a polysiloxane segment (a1) and a polymer segment (a2) other than the polysiloxane segment (a1) to form a dried product; and then performing pyrolysis thereof.

Item 17. A method for manufacturing an active material for negative electrodes of nonaqueous secondary batteries, the method comprising: performing spray pyrolysis of a dispersion liquid obtained from silicon particles, an organic solvent, and a composite resin (A) which has a silanol group and/or a hydrolysable silyl group and which contains a polysiloxane segment (a1) and a polymer segment (a2) other than the polysiloxane segment (a1).

Item 18. In the method for manufacturing an active material for negative electrodes of nonaqueous secondary batteries described in Item 16 or 17, the polysiloxane segment (a1) is a polysiloxane segment having a structural unit represented by the above general formula (S-2) and/or the above general formula (S-3).

Item 19. In the method for manufacturing an active material for negative electrodes of nonaqueous secondary batteries described in any one of Items 16 to 18, the content of the polysiloxane segment (a1) is 10 to 95 percent by mass with respect to the composite resin (A).

Item 20. In the method for manufacturing an active material for negative electrodes of nonaqueous secondary batteries described in any one of Items 16 to 19, the polymer segment (a2) is a vinyl polymer segment.

Item 21. In the method for manufacturing an active material for negative electrodes of nonaqueous secondary batteries described in any one of Items 16 to 20, the composite resin (A) is a composite resin in which the polysiloxane segment (a1) and the polymer segment (a2) are bonded to each other by a structure represented by the above structural formula (S-5).

Item 22. An active material for negative electrodes of nonaqueous secondary batteries which is obtained by the method described in any one of Items 16 to 21 is non-porous.

Item 23. A negative electrode for nonaqueous secondary batteries which uses the active material for negative electrodes of nonaqueous secondary batteries described in any one of Items 16 to 22.

Item 24. A nonaqueous secondary battery which uses the negative electrode for nonaqueous secondary batteries described in Item 23.

Hereinafter, the present invention will be described in detail.

(Composite Resin A)

As the composite resin (A) used in the present invention, for example, a composite resin having a graft structure in which the polysiloxane segment (a1) is chemically bonded to a side chain of the polymer segment (a2) or a composite resin having a block structure in which the polysiloxane segment (a1) is chemically bonded to a terminal of the polymer segment (a2) may be mentioned.

The polysiloxane segment (a1) of the composite resin (A) may have a thermally reactable functional group such as a polymerizable double bond therein. When a heat treatment is performed on the composite resin (A) before pyrolysis, a cross-linking reaction proceeds to form a solid phase, and hence a pyrolysis treatment can be easily performed.

As the polymerizable double bond described above, for example, a vinyl group or a (meth)acryloyl group may be mentioned. The number of polymerizable double bonds present in the polysiloxane segment (a1) is preferably two or more, more preferably 3 to 200, and further preferably 3 to 50. In addition, when a composite resin having at least two polymerizable double bonds is used as the composite resin (A), a cross-linking reaction can be easily performed.

The polysiloxane segment (a1) has a silanol group and/or a hydrolysable silyl group. In parallel with the thermosetting reaction described above, when a hydrolysis condensation reaction is performed between a hydroxyl group of the silanol group and a hydrolysable group of the hydrolysable silyl group, a cross-linking reaction of a polysiloxane structure of a coating film to be obtained proceeds, so that a solid composite resin (A) can be obtained.

The silanol group described in the present invention is a silicon-containing group having a hydroxyl group directly bonded to a silicon atom. The hydrolysable silyl group described in the present invention is a silicon-containing group having a hydrolysable group directly bonded to a silicon atom, and in particular, for example, the group represented by the following general formula may be mentioned.

[Chem. 5]

(In the formula, R¹ represents a monovalent organic group, such as an alkyl group, an aryl group, or an aralkyl group, R² represents a halogen atom, an alkoxy group, an acyloxy group, an aryloxy group, a mercapto group, an amino group, an amide group, an aminoxy group, an iminoxy group, or an alkenyloxy group. In addition, b represents an integer of 0 to 2.)

As the alkyl group mentioned above, for example, a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, 1-ethylpropyl group, a hexyl group, an isohecyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, or a 1-ethyl-1-methylpropyl group may be mentioned.

As the aryl group mentioned above, for example, a phenyl group, a naphthyl group, a 2-methylphenyl group, a 3-methylphenyl group, a 4-methylphenyl group, a 4-vinylphenyl group, or a 3-isopropylphenyl group may be mentioned.

As the aralkyl group mentioned above, for example, a benzyl group, a diphenylmethyl group, or a naphthylmethyl group may be mentioned.

As the halogen atom mentioned above, for example, a fluorine atom, a chlorine atom, a bromine atom, or an iodine atom may be mentioned.

As the alkoxy group mentioned above, for example, a methoxy group, an ethoxy group, a propoxy group, an isopropoxy group, a butoxy group, a sec-butoxy group, or a tert-butoxy group may be mentioned.

As the acyloxy group mentioned above, for example, formyloxy, acetoxy, propanoyloxy, butanoyloxy, pivaloyloxy, pentanoyloxy, phenylacetoxy, acetoacetoxy, benzoyloxy, or naphthoyloxy may be mentioned.

As the aryloxy group mentioned above, for example, phenyloxy or naphthyloxy may be mentioned.

As the alkenyloxy group mentioned above, for example, a vinyloxy group, an allyloxy group, a 1-propenyloxy group, an isopropenyloxy group, a 2-butenyloxy group, a 3-butenyloxy group, a 2-pentenyloxy group, a 3-methyl-3-butenyloxy group, or a 2-hexenyloxy group may be mentioned.

As the hydrolysable group of the hydrolysable silyl group of the polysiloxane segment (a1), for example, a halogen atom, an alkoxy group, a substituted alkoxy group, an acyloxy group, a phenoxy group, a mercapto group, an amino group, an amide group, an aminoxy group, an iminoxy group, or an alkenyloxy group may be mentioned, and when those groups are each hydrolyzed, the hydrolysable silyl group is formed into a silanol group. In addition, a hydroxyl group of this silanol group is used for dehydration condensation, so that a cross-linking reaction of a polysiloxane segment (a1) portion proceeds.

The polysiloxane segment (a1) is preferably a polysiloxane segment having a structural unit represented by the following general formula (S-2) and/or the following general formula (S-3). The polysiloxane segment having a structural unit represented by the following general formula (S-2) and/or the following general formula (S-3) has a three-dimensional network polysiloxane structure. Hence, when a composite resin having the polysiloxane segment as described above is used as the composite resin and is pyrolyzed, a SiOC compound can be obtained.

[Chem. 6]

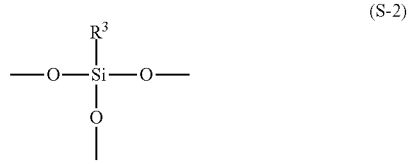

[Chem. 7]

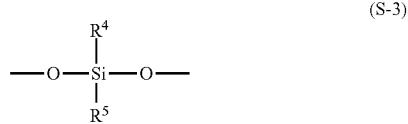

(In the above general formulas (S-2) and (S-3), R³, R⁴, and R⁵ each independently represent an alkyl group having 1 to 6 carbon atoms, a cycloalkyl group having 3 to 8 carbon atoms, an aryl group, or an aralkyl group having 7 to 12 carbon atoms.)

As the alkyl group having 1 to 6 carbon atoms mentioned above, for example, a methyl group, an ethyl group, a propyl group, an isopropyl group, a butyl group, an isobutyl group, a sec-butyl group, a tert-buty group, a pentyl group, an isopentyl group, a neopentyl group, a tert-pentyl group, a 1-methylbutyl group, a 2-methylbutyl group, a 1,2-dimethylpropyl group, 1-ethylpropyl group, a hexyl group, an isohecyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, or a 1-ethyl-1-methylpropyl group may be mentioned.

As the cycloalkyl group having 3 to 8 carbon atoms mentioned above, for example, a cyclopropyl group, a cyclobutyl group, a cyclopentyl group, or a cyclohexyl group may be mentioned.

As the aryl group mentioned above, for example, a phenyl group, a naphthyl group, a 2-methylphenyl group, a 3-methylphenyl group, a 4-methylphenyl group, a 4-vinylphenyl group, or a 3-isopropylphenyl group may be mentioned.

As the aralkyl group having 7 to 12 carbon atoms mentioned above, for example, a benzyl group, a diphenylmethyl group, or a naphthylmethyl group may be mentioned.

As the polysiloxane segment having a structural unit represented by the above general formula (S-2) and/or the above general formula (S-3), for example, a segment having the following structure may be mentioned.

[Chem. 8]

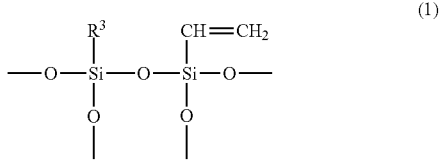

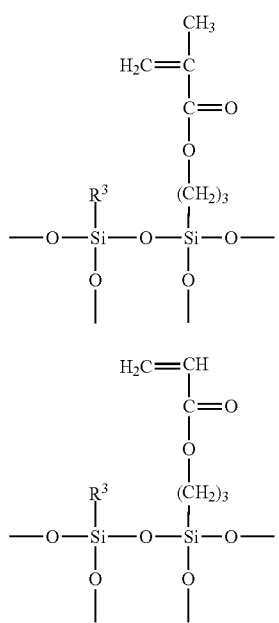

[Chem. 9]

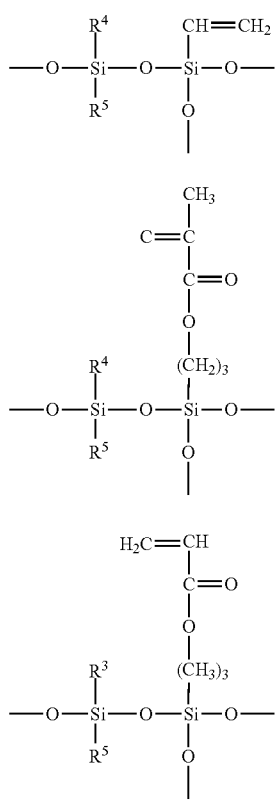

[Chem. 10]

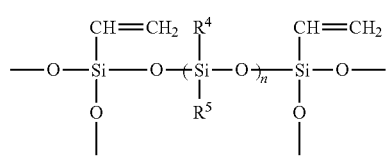

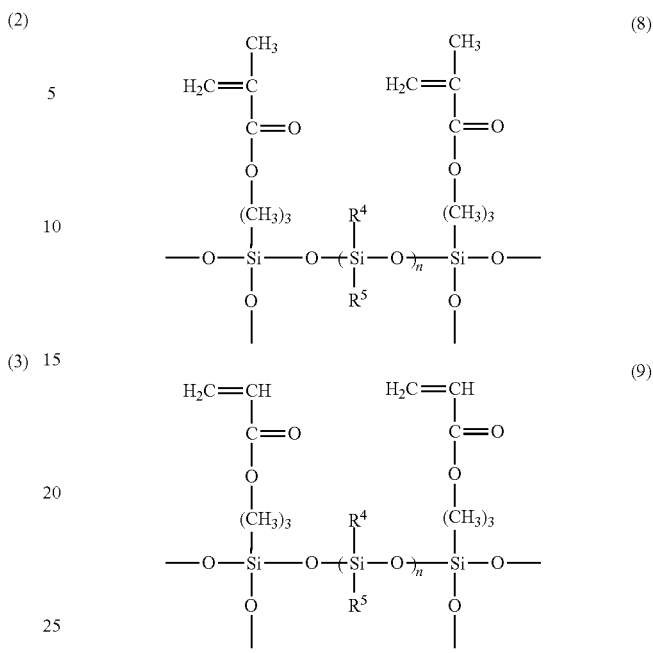

As the polymer segment (a2) of the composite resin (A) other than the polysiloxane segment (a1), for example, there may be mentioned a vinyl polymer segment of an acrylic polymer, a fluoro olefin polymer, a vinyl ester polymer, an aromatic vinyl polymer, or a polyolefin polymer; or a polymer segment, such as a polyurethane polymer segment, a polyester polymer segment, or a polyether polymer segment. Among those mentioned above, a vinyl polymer segment is preferable.

The polymer segment (a2) described above may have various types of functional groups if needed as long as the effect of the present invention is not inhibited. As the functional groups described above, for example, there may be used a carboxyl group, a blocked carboxyl group, a carboxylic anhydride group, a tertiary amino group, a hydroxyl group, a blocked hydroxyl group, a cyclocarbonate group, an epoxy group, a carbonyl group, a primary amide group, a secondary amide, a carbamate group, and a functional group represented by the following structural formula (S-4).

[Chem. 11]

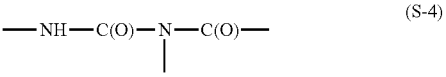

In addition, the above polymer segment (a2) may also have a polymerizable double bond, such as a vinyl group or a (meth)acryloyl group.

As the composite resin (A) used in the present invention, for example, there may be mentioned a composite resin in which the polysiloxane segment (a1) and the polymer segment (a2) are bonded to each other by a structure represented by the following structural formula (S-5) or the following structural formula (S-6).

[Chem. 12]

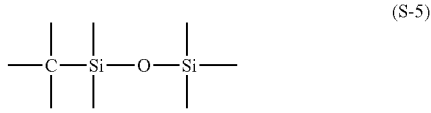

(S-5)

In the structural formula (S-5), the carbon atom is a carbon atom forming the polymer segment (a2), and the two silicon atoms are silicon atoms forming the polysiloxane segment (a1)).

[Chem. 13]

(S-6)

In the structural formula (S-6), the carbon atom is a carbon atom forming the polymer segment (a2), and the silicon atom is a silicon atom forming the polysiloxane segment (a1)).

As a more preferable mode of the composite resin (A) used in the present invention, for example, a composite resin may be mentioned in which the polysiloxane segment (a1) is a polysiloxane segment having a structural unit represented by the above general formula (S-2) and/or the above general formula (S-3), the polymer segment (a2) is a vinyl polymer segment, the polysiloxane segment (a1) and the polymer segment (a2) are bonded to each other by a structure represented by the above structural formula (S-5), and the content of the polysiloxane segment (a1) is 10 to 95 percent by mass with respect to the composite resin (A).

Although the composite resin (A) used in the present invention may be manufactured by various methods, in particular, manufacturing is preferably performed by one of the following methods (1) to (3).

(1) A method in which as a raw material of the polymer segment (a2), a polymer segment (a2-1) having a silanol group and/or a hydrolysable silyl group is prepared in advance, and this polymer segment (a2-1) is mixed with a silane compound containing a silane compound which has a silanol group and/or a hydrolysable silyl group and a polymerizable double bond to perform a hydrolysis condensation reaction.

(2) A method in which as a raw material of the polymer segment (a2), a polymer segment (a2-1) having a silanol group and/or a hydrolysable silyl group is prepared in advance; a silane compound containing a silane compound which has a silanol group and/or a hydrolysable silyl group and a polymerizable double bond is subjected to a hydrolysis condensation reaction to prepare a polysiloxane (a1-1) in advance; and the polymer segment (a2-1) and the polysiloxane (a1-1) are then mixed together to perform a hydrolysis condensation reaction.

(3) A method in which the above polymer segment (a2-1), a silane compound containing a silane compound which has a silanol group and/or a hydrolysable silyl group and a polymerizable double bond, and the polysiloxane (a1-1) are mixed together to perform a hydrolysis condensation reaction.

In the present invention, besides the mode in which the composite resin (A) is pyrolyzed, a mode in which a dispersion liquid obtained from the composite resin (A), silicon particles, and an organic solvent is pyrolyzed to obtain composite particles is also included.

(Silicon Particles)

The composite particles of the present invention contain at least one type of silicon particles formed of metal silicon or a silicon-containing compound. Although containing silicon, the silicon particles may also contain other atoms which are inevitably mixed therein in a range in which the effect of the present invention is not degraded. Although the purity of the silicon particles is not particularly limited, in view of battery capacity, a purity of 80 percent by mass or more is preferable.

Although the volume average particle diameter (50% D) of the silicon particles is not particularly limited, as the particle diameter is decreased, since fragmentation is suppressed, and cycle characteristics are improved, the average particle diameter is preferably 0.01 to 1 μm, more preferably 0.01 to 0.6 μm, and further preferably 0.01 to 0.4 μm.

The silicon particles may be used after being pulverized to have the above particle diameter.

As a pulverizer, for example, a ball mill, a bead mill, or a jet mill may be mentioned, and among those pulverizers, a bead mill is preferable since pulverizing performance is excellent, and a time to obtain a targeted particle diameter is short. As an organic solvent used for wet pulverizing, in order to prevent oxidation, an organic solvent containing no oxygen atoms in its structure is preferable. In particular, for example, an aromatic hydrocarbon solvent, such as toluene, xylene, naphthalene, or methylnaphthalene, may be used.

The content of the silicon particles in the composite resin is not particularly limited. In addition, by adjustment of the content of the silicon particles, the battery capacity can be controlled.

In the present invention, the content of the silicon particles in the composite particles is preferably 1 to 80 percent by mass, more preferably 1 to 70 percent by mass, and further preferably 1 to 60 percent by mass.

When the content of the silicon particles is 1 percent by mass or more, the capacity of the composite particle is 400 mAh/g or more, and as the negative electrode material, the composite particles become more superior to graphite in terms of capacity. On the other hand, when the content is 60 percent by mass or less, the silicon particles are sufficiently covered with SiOC, and the cycle characteristics are improved.

(Graphite Particles)

The composite particles may contain graphite particles. Although the graphite particles (graphite material) are roughly classified into a synthetic graphite and a natural graphite, in view of battery capacity and high purity, a synthetic graphite is preferable.

The shape thereof is not particularly limited, and scales, spheres, and the like may be mentioned.

(Metal Silicon or Silicon-Containing Compound)

The metal silicon or the silicon-containing compound used in the present invention is not particularly limited, and as the metal silicon, for example, a single crystalline, a polycrystalline, and an amorphous silicon may be mentioned. In addition, as the silicon-containing compound, an inorganic silicon compound and an organosilicon compound may be mentioned. As this inorganic silicon compound, for example, there may be mentioned an oxide, such as silicon oxide or silicon dioxide; a nitride such as silicon nitride; a carbide such as silicon carbide; an oxynitride, an oxycarbide, a silicon alloy, a metal silicide, a silicate, or the like.

In addition, as the organosilicon compound, for example, a low molecular weight organosilicon compound, such as a silane, a silazane, or a siloxane, or an organosilicon polymer or oligomer, such as a polysilane, a polysilazane, or a polysiloxane, may be mentioned. In consideration of handling characteristics, an organosilicon polymer or oligomer is preferably used as the organosilicon compound. The organosilicon compounds may be used alone, or at least two types thereof may be used in combination.

(Method for Manufacturing Composite Particles)

A method for manufacturing the composite particles includes a step of performing a dispersion treatment on the composite resin, the silicon particles, and an organic solvent to obtain a dispersion; a step of performing spray drying of the dispersion to form granules: and a step of performing a pyrolysis treatment on the granules to obtain composite particles, and if needed, other steps may also be included.

(Dispersion Step)

In the step of performing a dispersion treatment on the composite particles, the silicon particles, and an organic solvent to obtain a dispersion liquid, the composite resin is preferably dissolved in an organic solvent. Although the organic solvent is not particularly limited, a solvent, such as methyl ethyl ketone or ethyl acetate, dissolving or dispersing the resin is preferable.

As long as a uniform dispersion liquid can be obtained by a ultrasonic homogenizer, a stirrer type homogenizer, a mixing machine, or the like, a method of the dispersion treatment is not particularly limited.

The dispersion liquid is formed into granules by spray drying. Since the granules are formed by spray drying, and the solvent can be simultaneously removed, the uniformity of the silicon particles and a carbonaceous precursor is further ensured, and by the granule formation, the particle diameter control and the pore control can be more effectively performed.

The spray drying may be performed using a commercially available spray dryer, and since an organic solvent is used, a nitrogen atmospheric type spray dryer is preferably used. As a spray method, a disc type or a nozzle type method may be appropriately selected, for example, in accordance with the volume average particle diameter of targeted granules.

Since the particle diameter of the granules prepared by a spray dryer is approximately maintained even after a pyrolysis treatment which will be described later, in consideration of the particle diameter control and the uniformity of the particle diameter distribution of the composite particles obtained by a pyrolysis treatment of the granules, a nozzle type method is preferably used as the spray method.

Accordingly, granules, which are a precursor of the composite particles, having a preferable volume average particle diameter and a uniform particle diameter distribution can be efficiently obtained.

(Spray Drying)

The conditions for spray drying are not particularly limited, and in accordance with a spray drying machine, a spray method, and the like, a spray pressure, a spray amount, a drying temperature, and the like can be appropriately selected.

For example, when spray is performed by a nozzle method using a spray dryer (manufactured by Ohkawara Kakohki Co., Ltd., CNL-3) as a spray drying machine, a spray pressure and a spray inlet temperature can be set to 0.01 to 1 MPa and 30° C. to 300° C., respectively.

In addition, when the dispersion liquid is sprayed, in order to further maintain the uniformity, a method in which spray drying is performed while the dispersion liquid is subjected to a dispersion treatment may also be used. As the dispersion treatment performed during spray drying, the method used for dispersion liquid preparation, such as a stirrer treatment or a ultrasonic treatment, may be used.

(Pyrolysis)

The active material of the present invention may be obtained by pyrolysis of the composite resin (mode 1) or by pyrolysis of the dispersion liquid obtained from the composite resin, the silicone particles, and the organic solvent (mode 2).

In addition, the active material of the present invention may be obtained by pyrolysis of a dried product formed by spray drying of the dispersion liquid (mode 2-1).

In the case of the mode 2-1, spherical particles can be obtained, and the pyrolysis temperature and time can be more accurately controlled.

Furthermore, the active material of the present invention can be obtained by pyrolysis performed simultaneously with spraying (spray pyrolysis) of the dispersion liquid (mode 2-2).

In the case of the mode 2-2, compared to the mode 2-1, a pyrolysis process can be significantly simplified while the effect of the present invention is maintained, and the productivity per unit time is dramatically improved.

(Spray Pyrolysis)

Drying and pyrolysis may also be simultaneously performed by allowing liquid droplets prepared immediately after spraying to pass through a heating tube. After a solution is sprayed by a nozzle similar to that of a spray drying machine to form fine liquid droplets, the liquid droplets are allowed to pass through a heated ceramic tube for a predetermined time for carbonization, and a carbonized product obtained thereby is collected by a cyclone or the like. For example, when spray is performed by a nozzle method using a spray pyrolysis apparatus (manufactured by Ohkawara Kakohki Co., Ltd., RH-2), the spray pressure, the spray inlet temperature, the heating time, and the heating temperature may be set to 0.01 to 1 MPa, 30° C. to 300° C., 1 to 10 seconds, and 30° C. to 1,500° C., respectively.

The pyrolysis can be performed by a related known method and is not particularly limited, and for example, after the temperature is increased at approximately 5° C. per one minute in an inert gas atmosphere, pyrolysis may be performed at the following temperature.

Although not particularly limited, the pyrolysis temperature may be set preferably 500° C. to 1,500° C., more preferably 600° C. to 1,500° C., and particularly preferably 600° C. to 1,300° C.

In the case of the spray pyrolysis, the pyrolysis temperature is preferably set to 600° C. to 1,400° C. and more preferably 800° C. to 1,000° C.

As the inert gas, nitrogen, helium, and argon may be mentioned by way of example. In addition, in this inert gas, a reducing gas, such as a hydrogen gas, may also be contained.

A final reaching temperature of 1,500° C. or more is not preferable since the growth of silicon carbide is promoted. On the other hand, when the final reaching temperature is lower than the lower limit in the range described above, an organic component may not be sufficiently carbonized. In addition, this pyrolysis step may be performed through at least two stages. That is, at the first stage, pyrolysis is performed for a predetermined time at a temperature lower than the final reaching temperature, and pyrolysis can be again performed by increasing the temperature.

The heat treatment described above may be performed by either a fixed bed method or a fluid bed method, and a heating method of a carbonizing furnace and the type thereof are not particularly limited as long as a furnace having a function to perform heating to a predetermined temperature is used. As the carbonizing furnace, for example, a Riedhammer furnace, a tunnel furnace, or a single furnace may be mentioned.

Although the active material thus obtained may be either porous or non-porous, a non-porous material is preferable. In the present invention, the non-porous material indicates a material having pores which can be substantially ignored. In the present invention, a BET specific surface area indicates a specific surface area value of a powder measured in accordance with the "method of measuring gas adsorption amount by one-point method" described in Annex 2 of the Japanese Industrial Standard JIS Z8830-1990. The BET specific surface area may be measured by a specific surface area measuring apparatus. As the specific surface area measuring apparatus, for example, Tristar3000 (manufactured by Shimadzu Corp.) may be mentioned. For example, the BET specific surface area is preferably 5 $m^2/g$ or less, more preferably 4 $m^2/g$ or less, further preferably 3.5 $m^2/g$ or less, and even further preferably 3 $m^2/g$ or less.

Next, by the use of the active material for negative electrodes of nonaqueous secondary batteries of the present invention, a lithium-ion secondary battery was formed.

<Negative Electrode Material for Lithium-Ion Secondary Batteries>

A negative electrode material for lithium-ion secondary batteries of the present invention is formed so that at least one type of active material of the present invention is contained, and if needed, other components are also contained.

Since the active material of the present invention is contained, a negative electrode having a high capacity and excellent cycle characteristics for lithium-ion secondary batteries can be formed.

As the other components, for example, a binder resin and an electrically conductive auxiliary agent may be mentioned.

<Method for Manufacturing Negative Electrode Material for Lithium-Ion Secondary Batteries>

A method for manufacturing a negative electrode material for lithium-ion secondary batteries of the present invention includes a step of obtaining an active material by a method for manufacturing the active material. Accordingly, a negative electrode material for lithium-ion secondary batteries containing the active material described above can be efficiently manufactured.

A method for manufacturing the active material is as described above.

<Negative Electrode for Lithium-Ion Secondary Batteries>

A negative electrode for lithium-ion secondary batteries of the present invention is formed using the negative electrode material for lithium-ion secondary batteries described above. Accordingly, a lithium-ion secondary battery having a high capacity and excellent cycle characteristics can be formed.

The negative electrode for lithium-ion secondary batteries is formed in such a way that for example, the negative electrode material for lithium-ion secondary batteries of the present invention described above and an organic binder are kneaded with a solvent by a dispersing machine, such as a stirrer, a ball mill, a super sand mill, or a pressure kneader, to form a negative electrode material slurry, and this slurry is applied to a collector to form a negative electrode layer. Alternatively, a negative electrode material slurry paste is formed into a sheet or pellets and is then integrated with a collector to form a negative electrode layer.

Although the organic binder (hereinafter simply referred to as "binder") is not particularly limited, for example, there may be mentioned a styrene-butadiene copolymer; a (meth) acrylic copolymer formed from an ethylenic unsaturated carboxylate (such as methyl (meth)acrylate, ethyl (meth) acrylate, butyl (meth)acrylate, (meth)acrylonitrile, or hydroxyethyl (meth)acrylate) or an ethylenic unsaturated carboxylic acid (such as acrylic acid, methacrylic acid, itaconic acid, fumaric acid, or maleic acid); or a polymer compound, such as a poly(vinylidene fluoride), a poly (ethylene oxide), a polyepichlorohydrin, a polyphosphazene, a polyacrylonitrile, a polyimide, a poly(amide imide), or a carboxymethyl cellulose.

Depending on the physical characteristics of the binder, the binder is in the form of an aqueous dispersion, an aqueous solution, or an organic solution containing N-methyl-2-pyrrolidone (NMP) or the like as an organic solvent. The content of the organic binder in the negative electrode layer of the negative electrode for lithium-ion secondary batteries is preferably 1 to 30 percent by mass, more preferably 2 to 20 percent by mass, and further preferably 3 to 15 percent by mass.

When the content of the organic solvent is 1 percent by mass or more, the adhesion is good, and the negative electrode is suppressed from being fractured due to expansion and contraction thereof in charge and discharge. In contrast, when the content is 30 percent by mass or less, an increase in electrode resistance can be suppressed.

In addition, the negative electrode material slurry may be mixed with an electrically conductive auxiliary agent if needed. As the electrically conductive auxiliary agent, for example, carbon black, graphite, acetylene black, or an electrically conductive oxide, nitride, or the like may be mentioned. The use amount of the electrically conductive auxiliary agent with respect to the negative electrode material for lithium-ion secondary batteries of the present invention may be set to approximately 1 to 15 percent by mass.

In addition, the material and the shape of the collector described above are not particularly limited, and for example, there may be used a belt shape, such as a foil shape, a punched foil shape, or a mesh shape, formed from aluminum, copper, nickel, titanium, stainless steel, or the like. In addition, for example, a porous material, such as a porous metal (foamed metal) or carbon paper, may also be used.

As a method for applying the negative electrode slurry to a collector is not particularly limited, and for example, a known method, such as a metal mask printing method, an electrostatic coating method, a dip coating method, a spray coating method, a roll coating method, a doctor blade method, a gravure coating method, or a screen printing method, may be mentioned. After the application, if needed, a pressure flattening treatment, such as flat plate pressing or calendar rolling, is preferably performed.

In addition, the negative electrode material slurry formed into a sheet, pellets, or the like may be integrated with the collector by a known method, such as rolling, pressing, or combination therebetween.

The negative electrode layer formed on and integrated with the collector is preferably processed by a heat treatment in accordance with an organic binder which is used. For example, when an organic binder having a polyimide or a poly(amide imide) as a main skeleton is used, the heat treatment is preferably performed at 150° C. to 450° C.

By this heat treatment, removal of the solvent and increase in strength by curing of the binder are progressively performed, so that the adhesion among the particles and that between the collector and the particles are improved. In addition, in order to prevent oxidation of the collector in this treatment, the heat treatment is preferably performed in a vacuum atmosphere or an inert atmosphere containing helium, argon, nitrogen, or the like.

In addition, before the heat treatment is performed, the negative electrode is preferably pressed (subjected to a pressure application treatment). The electrode density of the negative electrode material for lithium-ion secondary batteries of the present invention is preferably 1.1 to 1.7 $g/cm^3$, more preferably 1.2 to 1.7 $g/cm^3$, and further preferably 1.3 to 1.7 $g/cm^3$. As the electrode density is increased, the adhesion tends to increase, and the cycle characteristics also tend to improve.

<Lithium-Ion Secondary Battery>

A lithium-ion secondary battery of the present invention uses the negative electrode for lithium-ion secondary batteries of the present invention described above. For example, the lithium-ion secondary battery of the present invention may be formed in such a way that the negative electrode for lithium-ion secondary batteries of the present invention and a positive electrode are disposed so as to face each other with a separator provided therebetween, and an electrolytic liquid is charged.

The positive electrode may be obtained by forming a positive electrode layer on a collector surface as is the case of the negative electrode. In this case, a collector having a belt shape, such as foil shape, a punched foil shape, or a mesh shape, formed from a metal, such as aluminum, titanium, or stainless steel, or an alloy may be used.

A positive electrode material used for the positive electrode layer is not particularly limited, and for example, a metal compound, a metal oxide, a metal sulfide, or an electrically conductive polymer material, which is able to dope or intercalate lithium ions, may be used and is not particularly restricted. For example, lithium cobalate ($LiCoO_2$), lithium nickelate ($LiNiO_2$), lithium manganate ($LiMnO_2$), a multiple oxide thereof ($LiCo_xNi_yMn_zO_2$, x+y+z=1), lithium manganese spinel ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, an olivine type $LiMPO_4$ (M: Co, Ni, Mn, or Fe), an electrically conductive polymer, such as a polyacetylene, a polyaniline, a polypyrrole, a polythiophene, or a polyacene, or a porous carbon may be used alone or in combination by mixing with each other.

As the separator, for example, a nonwoven cloth primarily formed of a polyolefin, such as a polyethylene or a polypropylene, a cloth, a fine porous film, or an assembled material formed in combination thereof may be used. In addition, if the structure is formed so that the positive electrode and the negative electrode of a lithium-ion secondary battery to be formed are not directly brought into contact with each other, the separator is not required.

As the electrolytic liquid described above, for example, a so-called organic electrolytic liquid may be used, and the organic electrolytic liquid is prepared in such a way that a lithium salt, such as $LiClO_4$, $LiPF_6$, $LiAsF_6$, $LiBF_4$, or $LiSO_3CF_3$, is dissolved in a nonaqueous solvent containing at least one selected from the group consisting of ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidine-2-on, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxy methane, tetrahydrofuran, 2-methyltetrahydrofuran, 1,3-dioxolane, methyl acetate, and ethyl acetate.

The structure of the lithium-ion secondary battery of the present invention is not particularly limited, and in general, the structure is formed in such a way that after a spiral type electrode plate group in which a positive electrode and a negative electrode are wound together with at least one separator if needed to form a flat and spiral shape or a laminate type electrode plate group in which a flat negative electrode and a flat positive electrode are laminated to each other with a flat separator if needed is formed, the electrode plate group thus formed is enclosed in an exterior package.

Although not particularly limited, the lithium-ion secondary battery of the present invention is used as a paper battery, a button battery, a coin battery, a laminate battery, a cylindrical battery, a square battery, or the like.

Although the negative electrode material for lithium-ion secondary batteries of the present invention has been described for a lithium-ion secondary battery, the negative electrode material described above may also be applied to any types of electrochemical apparatuses, such as a hybrid capacitor, having a charge and discharge mechanism in which lithium ions are inserted and released.

EXAMPLES

Next, the present invention will be described in more detail with reference to examples and comparative examples. Unless otherwise particularly noted, "part(s)" and "%" in examples are each on the mass basis.

<<Mode 1>>

Synthesis Example 1

Preparation Example of Composite Resin (A)

Into a reaction container equipped with a stirrer, a thermometer, a dripping funnel, a cooling tube, and a nitrogen gas inlet, 191 g of phenyltrimethoxysilane (PTMS) was charged, and the temperature was increased to 120° C. Next, a mixture of 169 g of methyl methacrylate (MMA), 11 g of 3-methacryloyloxy propyltrimethoxysilane (MPTS), and 18 g of tert-butyl peroxy-2-ethylhexanoate (TBPEH) was dripped to the reaction container described above over 4 hours. Subsequently, stirring was performed for 16 hours at the same temperature as described above, so that a vinyl polymer (a2-1-1) having a trimethoxysilyl group was prepared.

Next, the temperature of the above reaction container was controlled at 80° C., 131 g of methyltrimethoxysilane (MTMS), 226 g of 3-acryloyloxy propyltrimethoxysilane (APTS), and 116 g of dimethyldimethoxysilane (DMDMS) were added to the above reaction container.

Subsequently, a mixture of 6.3 g of "A-3" [manufactured by Sakai Chemical Industry Co., Ltd., iso-propyl acid phosphate] and 97 g of deionized water was dripped for 5 minutes, and stirring was performed for 2 hours at the same temperature as described above to perform a hydrolysis condensation reaction, so that a reaction product was obtained. By the analysis of the reaction product using $^1$H-NMR, it was found that approximately 100% of the trimethoxysilyl group of the vinyl polymer (a2-1-1) was hydrolyzed. Subsequently, the reaction product was distilled for 2 hours at a temperature of 40° C. to 60° C. and a reduced pressure of 10 to 300 mmHg to remove generated methanol and water, so that 600 g of a composite resin (A1) having a nonvolatile component of 99.4% and formed of a polysiloxane segment (a1) and a vinyl polymer segment (a2) was obtained.

Synthesis Example 2

Into a reaction container similar to that in Synthesis Example 1-1, 250 g of PTMS was charged, and the temperature was increased to 120° C. Next, a mixture of 169 g of MMA, 11 g of MPTS, and 18 g of TBPEH was dripped to the reaction container described above over 4 hours. Subsequently, stirring was performed for 16 hours at the same temperature as described above, so that a vinyl polymer (a2-1-2) having a trimethoxysilyl group was prepared.

Next, the temperature of the above reaction container was controlled at 80° C., 172 g of MTMS, 113 g of APTS, and 151 g of DMDMS were added to the above reaction container. Subsequently, a mixture of 6.9 g of "A-3" and 105 g of deionized water was dripped for 5 minutes, and stirring was performed for 2 hours at the same temperature as described above to perform a hydrolysis condensation reaction, so that a reaction product was obtained. By the analysis of the reaction product using $^1$H-NMR, it was found that approximately 100% of the trimethoxysilyl group of the vinyl polymer (a2-1-2) was hydrolyzed. Subsequently, the reaction product was distilled for 2 hours at a temperature of 40° C. to 60° C. and a reduced pressure of 10 to 300 mmHg to remove generated methanol and water, and 400 g of BuAc was then added, so that 1,000 g of a solution of a composite resin (A2) having a nonvolatile component of 60.0% and formed of a polysiloxane segment (a1) and a vinyl polymer segment (a2) was obtained.

Synthesis Example 3

Into a reaction container similar to that in Synthesis Example 1-1, 164 g of PTMS was charged, and the temperature was increased to 120° C. Next, a mixture of 226 g of MMA, 14 g of MPTS, and 24 g of TBPEH was dripped to the reaction container described above over 4 hours. Subsequently, stirring was performed for 16 hours at the same temperature as described above, so that a vinyl polymer (a2-1-3) having a trimethoxysilyl group was prepared.

Next, the temperature of the above reaction container was controlled at 80° C., 113 g of MTMS, 194 g of APTS, and 99 g of DMDMS were added to the above reaction container. Subsequently, a mixture of 5.4 g of "A-3" and 83 g of deionized water was dripped for 5 minutes, and stirring was performed for 2 hours at the same temperature as described above to perform a hydrolysis condensation reaction, so that a reaction product was obtained. By the analysis of the reaction product using $^1$H-NMR, it was found that approximately 100% of the trimethoxysilyl group of the vinyl polymer (a2-1-3) was hydrolyzed. Subsequently, the reaction product was distilled for 2 hours at a temperature of 40° C. to 60° C. and a reduced pressure of 10 to 300 mmHg to remove generated methanol and water, and 400 g of BuAc was then added, so that 1,000 g of a solution of a composite resin (A3) having a nonvolatile component of 59.8% and formed of a polysiloxane segment (a1) and a vinyl polymer segment (a2) was obtained.

Synthesis Example 4

Into a reaction container similar to that in Synthesis Example 1, 191 g of PTMS was charged, and the temperature was increased to 120° C. Next, a mixture of 169 g of MMA, 11 g of MPTS, and 18 g of TBPEH was dripped to the reaction container described above over 4 hours. Subsequently, stirring was performed for 16 hours at the same temperature as described above, so that a vinyl polymer (a2-1-4) having a trimethoxysilyl group was prepared.

Next, the temperature of the above reaction container was controlled at 80° C., 454 g of MTMS and 116 g of DMDMS were added thereto. Subsequently, a mixture of 8.4 g of "A-3" and 134 g of deionized water was dripped for 5 minutes, and stirring was performed for 2 hours at the same temperature as described above to perform a hydrolysis condensation reaction, so that a reaction product was obtained. By the analysis of the reaction product using $^1$H-NMR, it was found that approximately 100% of the trimethoxysilyl group of the vinyl polymer (a2-1-4) was hydrolyzed.

Subsequently, the reaction product was distilled for 2 hours at a temperature of 40° C. to 60° C. and a reduced pressure of 10 to 300 mmHg to remove generated methanol and water, and 400 g of BuAc was then added, so that 1,000 g of a solution of a composite resin (A4) having a nonvolatile component of 60.1% and formed of a polysiloxane segment (a1) having no polymerizable double bond and a vinyl polymer segment (a2) was obtained.

TABLE 1

| | | | Synthesis Example 1 | Synthesis Example 2 |
|---|---|---|---|---|
| Composite Resin | | | A1 | A2 |
| Silane Compound Forming Polysiloxane Segment | PTMS | g | 191 | 250 |
| | MTMS | | 131 | 172 |
| | DMDMS | | 116 | 151 |
| | APTS | | 226 | 113 |
| Vinyl Monomer Forming Polymer Segment | MMA | | 169 | 169 |
| | MPTS | | 11 | 11 |
| Initiator | TBPEH | | 18 | 18 |
| Solvent | BuAc | | | 400 |
| Polysiloxane Segment/Polymer Segment (Mass Ratio) | | | 70/30 | 70/30 |
| Nonvolatile Component (%) | | | 99.4 | 60.0 |

TABLE 2

| | | | Synthesis Example 3 |
|---|---|---|---|
| Composite Resin | | | A3 |
| Silane Compound Forming Polysiloxane Segment | PTMS | g | 164 |
| | MTMS | | 113 |
| | DMDMS | | 99 |
| | APTS | | 194 |
| Vinyl Monomer Forming Polymer Segment | MMA | | 226 |
| | MPTS | | 14 |
| Initiator | TBPEH | | 24 |
| Solvent | BuAc | | 400 |
| Polysiloxane Segment/Polymer Segment (Mass Ratio) | | | 60/40 |
| Nonvolatile Component (%) | | | 59.8 |

TABLE 3

| | | | Synthesis Example 4 |
|---|---|---|---|
| Composite Resin | | | A4 |
| Silane Compound Forming Polysiloxane Segment | PTMS | g | 191 |
| | MTMS | | 454 |
| | DMDMS | | 116 |

TABLE 3-continued

|  |  | Synthesis Example 4 |
| --- | --- | --- |
| Vinyl Monomer Forming Polymer Segment | MMA | 169 |
|  | MPTS | 11 |
| Initiator | TBPEH | 18 |
| Solvent | BuAc | 400 |
| Polysiloxane Segment/Polymer Segment (Mass Ratio) |  | 70/30 |
| Nonvolatile Component (%) |  | 60.1 |

The abbreviations in Tables 1 to 3 are as follows.
"PTMS": phenyltrimethoxysilane
"MTMS": methyltrimethoxysilane
"DMDMS": dimethyldimethoxysilane
"APTS": 3-acryloyloxy propyltrimethoxysilane
"MPTS": 3-methacryloyloxy propyltrimethoxysilane
"MMA": methyl methacrylate
"TBPEH": tert-butyl peroxy-2-ethylhexanoate
"BuAc": butyl acetate Example 1-1

Pyrolysis of Composite Resin and Formation of Coin Cell

In a nitrogen-atmospheric pyrolysis furnace, 25 parts of the composite resin (A1) was pyrolyzed at 1,000° C. for 1 hour, so that a pyrolysis product was obtained. From the result of Raman measurement (microscopic Raman spectroscope manufactured by RENISHAW) of the pyrolysis product thus obtained, peaks of 1,593 $cm^{-1}$ and 1,335 $cm^{-1}$ were observed, so that the presence of carbon was confirmed.

To 1 part of the obtained pyrolysis product, 9 parts of a commercially available graphite, a small amount of a carboxymethyl cellulose (manufactured by Nippon Paper Industries Co., Ltd.), and 12.5 parts of water were added and then mixed together by a planetary centrifugal mixer. After a small amount of a commercially available SBR binder resin was added, mixing was again performed by a planetary centrifugal mixer, so that a slurry was formed. The slurry thus obtained was applied on copper foil by an applicator (3MIL) and then dried, so that a negative electrode was obtained. A disc having a diameter of 14 mm was obtained by punching and then pressed (press oil pressure: 10 MPa) to form an evaluation cell (B1-1).

As an evaluation coin cell, a CR2032 type coin cell was used. The negative electrode and metal lithium were disposed so as to face each other with a polypropylene-made separator having a thickness of 25 μm provided therebetween, and an electrolytic liquid (Kishida Chemical Co., Ltd., 1 mol/L of $LiPF_6$, diethyl carbonate/ethylene carbonate=1:1 (volume ratio)) was charged, so that the evaluation cell was formed.

Subsequently, a charge discharge test was performed at room temperature, that is, at 25° C. After discharge was performed to 0 V at a constant current of 0.1C, discharge was performed at a constant voltage of 0 V until the current reached 20 μA. In addition, charge was performed to 1.2 V at a constant current of 0.1C.

Example 1-2

Except that after the solvent was distilled away, the composite resin (A2) was used instead of using the composite resin (A1), pyrolysis of the composite resin and formation of an evaluation cell (B1-2) were performed in a manner similar to that of Example 1-1.

Hereinafter, as described above, formation of Example 1-3 (formation of an evaluation cell (B1-3) using the composite resin (A3)) and formation of Example 1-4 (formation of an evaluation cell (B1-4) using the composite resin (A4)) were performed.

Comparative Example 1

Except that graphite was used instead of using the composite resin (A1), the result of formation of an evaluation cell (C1) performed in a manner similar to that of Example 1-1 is shown in Table 4.

TABLE 4

|  | Evaluation Cell | Discharge Capacity (mAh/g) |
| --- | --- | --- |
| Example 1-1 | B1-1 | 769 |
| Example 1-2 | B1-2 | 760 |
| Example 1-3 | B1-3 | 759 |
| Example 1-4 | B1-4 | 730 |
| Comparative Example 1 | C1 | 372 |

Example 1-5

In a nitrogen-atmospheric pyrolysis furnace, the composite resin (A1) was pyrolyzed at 1,000° C. for 1 hour in a manner similar to that of Example 1-1, so that a pyrolysis product was obtained. Subsequently, the pyrolysis product was pulverized for 2 hours by a bead mill using zirconia-made beads. The obtained pulverized product had an average particle diameter of 2 μm (D50, laser scattering type particle distribution meter L910 by Horiba, Ltd.). A BET specific surface area measured by a specific surface area measurement apparatus (manufactured by Shimadzu Corp., Tristar3000) was 3 $m^2/g$. To 8 parts of the obtained powder, 1 part of acetylene black, a small amount of a carboxymethyl cellulose (manufactured by Nippon Paper Industries Co., Ltd.), and 15 parts of water were added and then mixed together by a planetary centrifugal mixer. After a small amount of a commercially available SBR binder resin was added, mixing was again performed by a planetary centrifugal mixer, so that a slurry was formed. The slurry thus obtained was applied on copper foil by an applicator (3MIL) and then dried, so that a negative electrode was obtained. A disc having a diameter of 14 mm was obtained by punching and then pressed (press oil pressure: 10 MPa) to form an evaluation cell (B1-5).

Example 1-6

Except that the pyrolysis of the composite resin (A1) was performed at 1,000° C. for 3 hours, an evaluation cell (B1-6) was formed in a manner similar to that of Example 1-5.

The average particle diameter of the obtained pulverized product was 2 μm, and the BET specific surface area was 3 $m^2/g$. The measurement methods of the average particle diameter and the BET specific surface area were similar to those of Example 1-5. The results of Example 1-5 and 1-6 are shown in Table 5.

In Examples 1-1 to 1-4, in order to obtain stable battery characteristics, 9 parts of graphite was used. On the other hand, in Examples 1-5 and 1-6, graphite was not used, and a larger amount of the active material of the present invention was used; hence, while stable battery characteristics are maintained, preferable results, in particular, a preferable discharge capacity, can be obtained.

TABLE 5

|  | Evaluation Cell | Discharge Capacity (mAh/g) |
|---|---|---|
| Example 1-5 | B1-5 | 1165 |
| Example 1-6 | B1-6 | 1262 |

<<Mode 2-1>>

Example 2-1

Pyrolysis of Composite Resin and Formation of Evaluation Coin Cell

A dispersion obtained by mixing and dispersing 25 parts of a commercially available silicon powder (Kanto Metal Corp., average particle diameter: 2.9 μm), 25 parts of the composite resin (A1), and 50 parts of methyl ethyl ketone was processed by a granulation treatment using a nitrogen-atmospheric spray dryer (manufactured by Ohkawara Kakohki Co., Ltd.: CNL-3). As spray drying conditions, a liquid flow rate, a spray gas pressure, and a hot wind inlet temperature were set to 0.6 kg/hr, 0.1 MPa, and 60° C., respectively. Granules thus obtained were pyrolyzed at 1,000° C. for 1 hour in a nitrogen atmospheric pyrolysis furnace, so that composite particles were obtained. The average particle diameter of the obtained composite particles measured by a laser diffraction/scattering particle size distribution meter (LA-910 by Horiba, Ltd.) was 32 μm (31 μm before pyrolysis).

From the result of Raman measurement (microscopic Raman spectroscope manufactured by RENISHAW) of the pyrolysis product thus obtained, peaks of 1,593 $cm^{-1}$ and 1,335 $cm^{-1}$ were observed, so that the presence of carbon was confirmed.

To 1 part of the obtained pyrolysis product, 9 parts of a commercially available graphite, a small amount of a carboxymethyl cellulose (manufactured by Nippon Paper Industries Co., Ltd.), and 12.5 parts of water were added and then mixed together by a planetary centrifugal mixer. After a small amount of a commercially available SBR binder resin was added, mixing was again performed by a planetary centrifugal mixer, so that a slurry was formed. The slurry thus obtained was applied on copper foil by an applicator (3MIL) and then dried, so that a negative electrode was obtained. A disc having a diameter of 14 mm was obtained by punching and then pressed (press oil pressure: 10 MPa) to form an evaluation cell (B2-1).

Example 2-2

Except that the composite resin (A2) was used instead of using the composite resin (A1), pyrolysis of the composite resin and formation of an evaluation cell (B2-2) were performed in a manner similar to that of Example 2-1.

Example 2-3

Hereinafter, as described above, formation of Example 2-3 (formation of an evaluation cell (B2-3) by the use of the composite resin (A3)) was performed.

Comparative Example 2

Except that silicon was used instead of using the composite resin (A1), an evaluation cell (C2) was formed in a manner similar to that of Example 2-1. The results are shown in Table 6.

TABLE 6

|  | Evaluation Cell | Discharge Capacity (mAh/g) | First-Time Charge Discharge Efficiency (%) | Capacity Retention (Charge, 10 Cycles) (%) |
|---|---|---|---|---|
| Example 2-1 | B2-1 | 760 | 81 | 76 |
| Example 2-2 | B2-2 | 759 | 83 | 80 |
| Example 2-3 | B2-3 | 730 | 82 | 79 |
| Comparative Example 2 | C2 | 741 | 79 | 62 |

<<Mode 2-2>>

Example 2-4

After 50 parts of the composite resin (A1) was mixed with and dispersed in 50 parts of methyl ethyl ketone, carbonization was performed using a spray pyrolysis apparatus (RH2 manufactured by Ohkawara Kakohki Co., Ltd.). As spray pyrolysis conditions, an inside-furnace temperature and a nozzle-gas (nitrogen) pressure were set to 890° C. and 0.1 MPa, respectively. To 8 parts of the obtained powder, 1 part of acetylene black, a small amount of a carboxymethyl cellulose (manufactured by Nippon Paper Industries Co., Ltd.), and 12.5 parts of water were added and then mixed together by a planetary centrifugal mixer. After a small amount of a commercially available SBR binder resin was added, mixing was again performed by a planetary centrifugal mixer, so that a slurry was formed. The slurry thus obtained was applied on copper foil by an applicator (3MIL) and then dried, so that a negative electrode was obtained. A disc having a diameter of 14 mm was obtained by punching and then pressed (press oil pressure: 10 MPa) to form an evaluation cell (B2-4).

Example 2-5

As in the case of Example 2-4, after a spray pyrolyzed product was obtained, pyrolysis was again performed at 1,000° C. for 1 hour in a nitrogen atmosphere to form a coin cell, so that an evaluation cell (B2-5) was obtained.

In Examples 2-4 and 2-5, the pyrolysis process could be significantly simplified as compared to that of Examples 2-1 to 2-3 described above, and the productivity of the active material per unit time could be dramatically improved.

Furthermore, the evaluation cells B2-4 and B2-5 each had a high capacity similar to that of each of Examples 2-1 to 2-3 (evaluation cells B2-1 to B2-3) and showed preferable cycle characteristics.

INDUSTRIAL APPLICABILITY

The active material for negative electrodes of nonaqueous secondary batteries obtained by pyrolysis of the composite resin of the present invention can be used for negative electrodes of nonaqueous secondary batteries, and the negative electrode described above can be preferably used for nonaqueous secondary batteries.

The invention claimed is:

1. A method for producing an active material for negative electrodes of nonaqueous secondary batteries; the method comprising performing calcination of a composite resin (A), wherein composite resin (A) comprises a silanol group and/or a hydrolysable silyl group and comprises a polysiloxane segment (a1) and a polymer segment (a2) other than the polysiloxane segment (a1), the polysiloxane segment (a1) is a polysiloxane segment comprising a structural unit represented by the following general formula (S-2) and/or the following general formula (S-3)

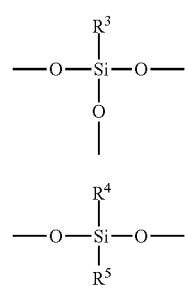

in the general formulas (S-2) and (S-3), $R^3$, $R^4$, and $R^5$ each independently represent an alkyl group having 1 to 6 carbon atoms, a cycloalkyl group having 3 to 8 carbon atoms, an aryl group, or an aralkyl group having 7 to 12 carbon atoms, and the composite resin (A) comprises a structure represented by the following structural formula (S-5)

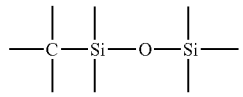

in the structural formula (S-5), the carbon atom is a carbon atom forming the polymer segment (a2), and the two silicon atoms are silicon atoms forming the polysiloxane segment (a1), and the polymer segment (a2) is a vinyl polymer segment of an acrylic polymer.

2. The method according to claim 1, wherein the content of the polysiloxane segment (a1) is 10 to 95 percent by mass with respect to the composite resin (A).

3. The method according to claim 1, wherein prior to performing calcination the method further comprises obtaining a dispersion liquid from silicon particles; an organic solvent; and the composite resin (A).

4. The method according to claim 3, wherein the dispersion liquid is sprayed and dried to obtain a dried product, and calcination of the composite resin (A) is performed by calcination of the dried product.

5. The method according to claim 3, wherein calcination of the composite resin (A) comprises the calcination of the dispersion liquid performed under a spray pyrolysis condition.

6. The method according to claim 1, wherein the active material has a BET specific surface area of 5 $m^2/g$ or less.

7. The method according to claim 3, wherein the active material has a BET specific surface area of 5 $m^2/g$ or less.

* * * * *